(12) United States Patent
Gupta et al.

(10) Patent No.: US 11,507,652 B2
(45) Date of Patent: Nov. 22, 2022

(54) PROTECTING COMMUNICATION DEVICES FROM UNWANTED ACCESS

(71) Applicant: MOTOROLA MOBILITY LLC, Chicago, IL (US)

(72) Inventors: Ranjeet Gupta, Naperville, IL (US); Joel D. Voss, Elkhorn, WI (US)

(73) Assignee: Motorola Mobility LLC, Chicago, IL (US)

( * ) Notice: Subject to any disclaimer, the term of this patent is extended or adjusted under 35 U.S.C. 154(b) by 191 days.

(21) Appl. No.: 16/745,692

(22) Filed: Jan. 17, 2020

(65) Prior Publication Data
US 2021/0224376 A1 Jul. 22, 2021

(51) Int. Cl.
*G06F 21/45* (2013.01)
(52) U.S. Cl.
CPC .................................... *G06F 21/45* (2013.01)
(58) Field of Classification Search
CPC ........... G06F 21/32; G06F 21/45; G06F 21/81
See application file for complete search history.

(56) References Cited

U.S. PATENT DOCUMENTS

| | | | |
|---|---|---|---|
| 2012/0226912 A1* | 9/2012 | King | G06F 21/31 713/183 |
| 2017/0075316 A1* | 3/2017 | Berdinis | G06F 1/163 |
| 2017/0091512 A1* | 3/2017 | Kumano | G09G 5/003 |
| 2018/0349649 A1* | 12/2018 | Martel | G06F 21/71 |
| 2019/0080189 A1* | 3/2019 | Van Os | G06V 40/166 |
| 2019/0357015 A1* | 11/2019 | Wheeler | H04M 19/044 |
| 2021/0224376 A1* | 7/2021 | Gupta | G06F 21/45 |
| 2022/0021682 A1* | 1/2022 | McCarty | H04L 63/102 |

* cited by examiner

*Primary Examiner* — Dao Q Ho
(74) *Attorney, Agent, or Firm* — Isidore PLLC

(57) ABSTRACT

A method, a communication device and a computer program product for protecting communication devices from access by unauthorized users. The method includes retrieving, from a memory, a biometric sensor disable time range and determining, via a processor of the communication device, if a current time is within the biometric sensor disable time range. In response to determining that the current time is within the biometric sensor disable time range, the method further includes determining if the communication device is in a sleep mode and in response to determining that the communication device is in the sleep mode, disabling at least one biometric sensor.

17 Claims, 8 Drawing Sheets

PROTECTING COMMUNICATION DEVICES FROM UNWANTED ACCESS

BACKGROUND

1. Technical Field

The present disclosure generally relates to communication devices and in particular to protecting communication devices from unwanted or unauthorized access.

2. Description of the Related Art

Mobile communication devices, such as cell phones, are widely used for voice communication and data transmission. Biometric authentication allows a user secure access to their communication device using various biomarkers such as fingerprints and facial images. Unfortunately, if the user is sleeping or otherwise not alert, another individual may be able to access the communication device by touching the user's finger to the fingerprint sensor or positioning the communication device to capture the user's facial image.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
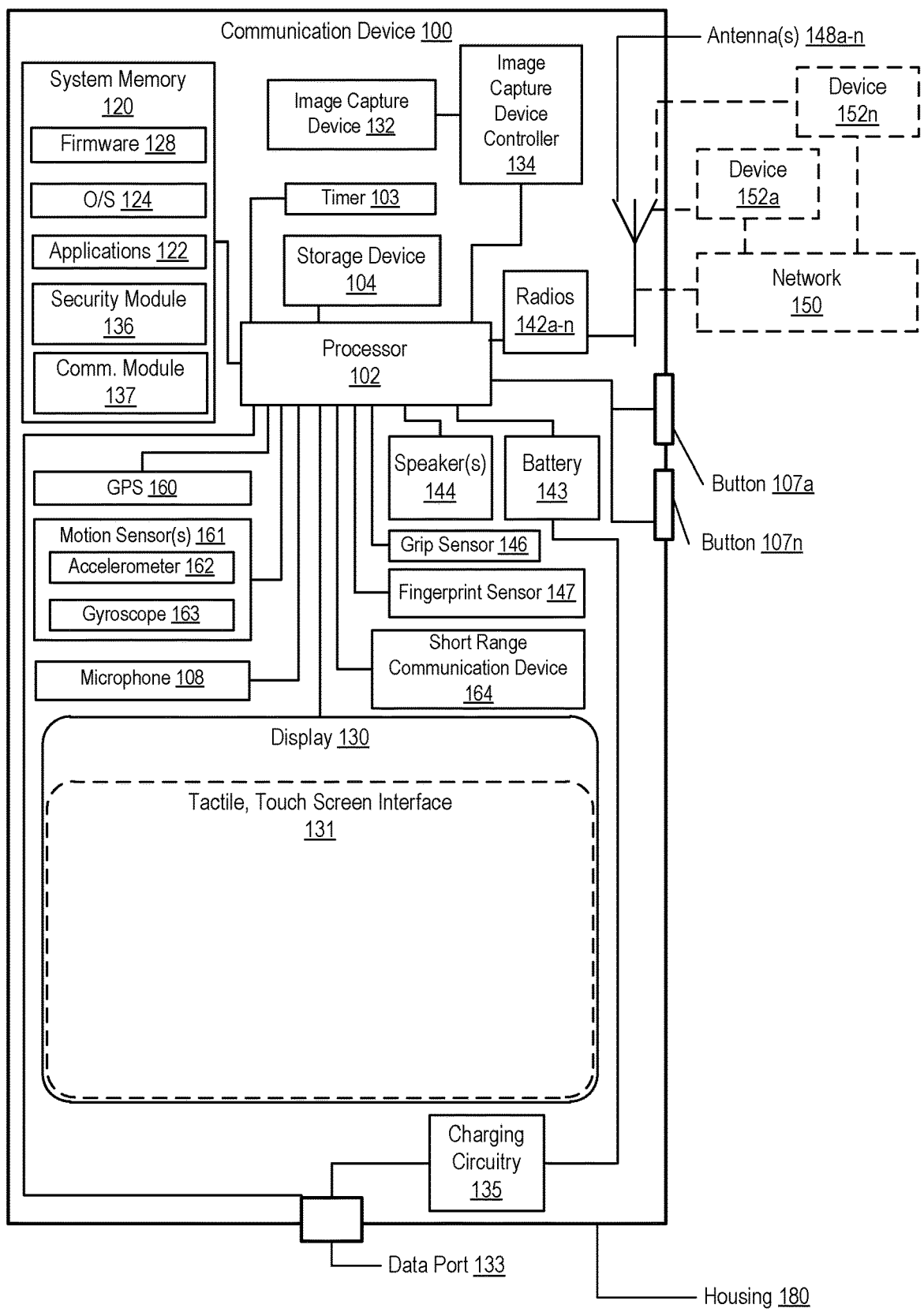
FIG. 1A depicts an example communication device configured as a mobile device within which various aspects of the disclosure can be implemented, according to one or more embodiments.

The illustrative embodiments provide a method, a communication device, and a computer program product for protecting communication devices from unwanted or unauthorized access. The method includes retrieving, from a memory, a biometric sensor disable time range and determining, via a processor of the communication device, if a current time is within the biometric sensor disable time range. The method further includes in response to determining that the current time is within the biometric sensor disable time range, determining if the communication device is in a sleep mode. The method further includes in response to determining that the communication device is in the sleep mode, disabling at least one biometric sensor that is used to provide access to the communication device.

According to another embodiment, a communication device includes a biometric device that enables user access to the communication device and a memory having stored thereon a security module for protecting the communication device from unwanted or unauthorized access. The communication device also includes a display and one or more processors communicatively coupled to the memory and the display. The one or more processors execute program code of the security module, which enables the communication device to: retrieve a biometric sensor disable time range and determine if a current time is within the biometric sensor disable time range. In response to determining that the current time is within the biometric sensor disable time range, the program code further enables the communication device to determine if the communication device is in a sleep mode. The program code further enables the communication device to disable at least one biometric sensor in response to determining that the communication device is in the sleep mode.

According to an additional embodiment, a computer program product includes a computer readable storage device with program code stored thereon. The program code, when executed by one or more processors of a communication device having at least one biometric sensor, enables the communication device to complete the functionality of: retrieving a biometric sensor disable time range and determining if a current time is within the biometric sensor disable time range. The computer program product further enables the communication device to, in response to determining that the current time is within the biometric sensor disable time range, determine if the communication device is in a sleep mode. The computer program product further enables the communication device to in response to determining that the communication device is in the sleep mode, disable the at least one biometric sensor.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure.

The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within communication device 100 (FIG. 1A) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1A depicts an example communication device 100 configured as a mobile device within which various aspects of the disclosure can be implemented, according to one or more embodiments. Examples of such communication devices include, but are not limited to, a notebook computer, a mobile phone, a digital camera, and a tablet computer, etc. Communication device 100 includes processor 102, which is communicatively coupled to timer 103, storage device 104, system memory 120, display 130, image capture device 132, and image capture device controller 134.

System memory 120 may be a combination of volatile and non-volatile memory, such as random access memory (RAM) and read-only memory (ROM). System memory 120 can store program code or similar data associated with firmware 128, an operating system 124, applications 122, security module 136 and communication module 137. Security module 136 includes program code that is executed by processor 102 to protect communication device 100 from unwanted access.

Communication module 137 includes program code that is executed by processor 102 to enable communication device 100 to communicate with other devices and systems. Processor 102 loads and executes program code stored in system memory 120. Examples of program code that may be loaded and executed by processor 102 include program code associated with applications 122 and program code associated with security module 136 and communication module 137. Although depicted as being separate from applications 122, security module 136 and communication module 137 may also be each implemented as an application.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touch screen device, display 130 includes a tactile, touch screen interface 131 that allows a user to provide input to or control communication device 100 by touching features presented within/below the display screen.

In one embodiment, image capture device 132 is communicatively coupled to image capture device controller 134, which is communicatively coupled to processor 102. Image capture device 132 can capture images that are within the field of view of image capture device 132. In at least one embodiment, image capture device 132 provides the functionality of a biometric sensor that can capture biometric data in facial images of users in proximity to communication device 100.

Communication device 100 can further include data port 133, charging circuitry 135, and battery 143. Communication device 100 further includes a microphone 108, one or more speakers 144 and one or more input buttons 107a-n. Input buttons 107a-n may provide controls for volume, power, and image capture device 132.

Communication device 100 further includes radios 142a-n, which are coupled to antennas 148a-n. In some embodiments, radios 142a-n can use various wireless communication technologies, such as global system for mobile communications (GSM), code division multiple access (CDMA), long term evolution (LTE), fifth generation (5G), etc. In this implementation, radios 142a-n and antennas 148a-n allow communication device 100 to communicate wirelessly, via wireless network 150 (e.g., using eNodeB or WiFI access point), with other devices 152*a-n* that are external to communication device 100.

Communication device 100 further includes grip sensor 146, fingerprint sensor 147, global positioning system (GPS) device 160 and motion sensor 161. Grip sensor 146 is a pressure or tactile sensor arranged on the peripheral edge of the housing of communication device 100. Grip sensors 146 measure the force applied by a user's hand and can provide biometric data, such as hand force data, to processor 102 to identify a user of communication device 100. Fingerprint sensor 147 is a biometric sensor that can scan the finger of a user and generate biometric data or fingerprint data corresponding to the user's fingerprint. A user places his/her finger over the fingerprint sensor 147 in order to initiate scanning of the fingerprint. Fingerprint sensor 147 can be used to provide biometric data to identify a user. GPS device 160 can provide time data and location data about the physical location of communication device 100 using geospatial input received from GPS satellites.

Motion sensor(s) 161 can include one or more accelerometers 162 and gyroscope 163. Motion sensor(s) 161 can detect movement of communication device 100 and provide motion data to processor 102 indicating the spatial orientation and movement of communication device 100. Accelerometers 162 measure linear acceleration of movement of communication device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of communication device 100. Communication device 100 further includes a housing 180 that encloses and contains the components of the communication device.

Communication device 100 further includes short range communication device(s) 164. Short range communication device(s) 164 is a low powered transceiver that wirelessly communicates with other devices. Short range communication device(s) 164 can include one or more of a variety of devices, such as a near field communication (NFC) device, a Bluetooth device, and/or a wireless fidelity (Wi-Fi) device.

Figure 1B:
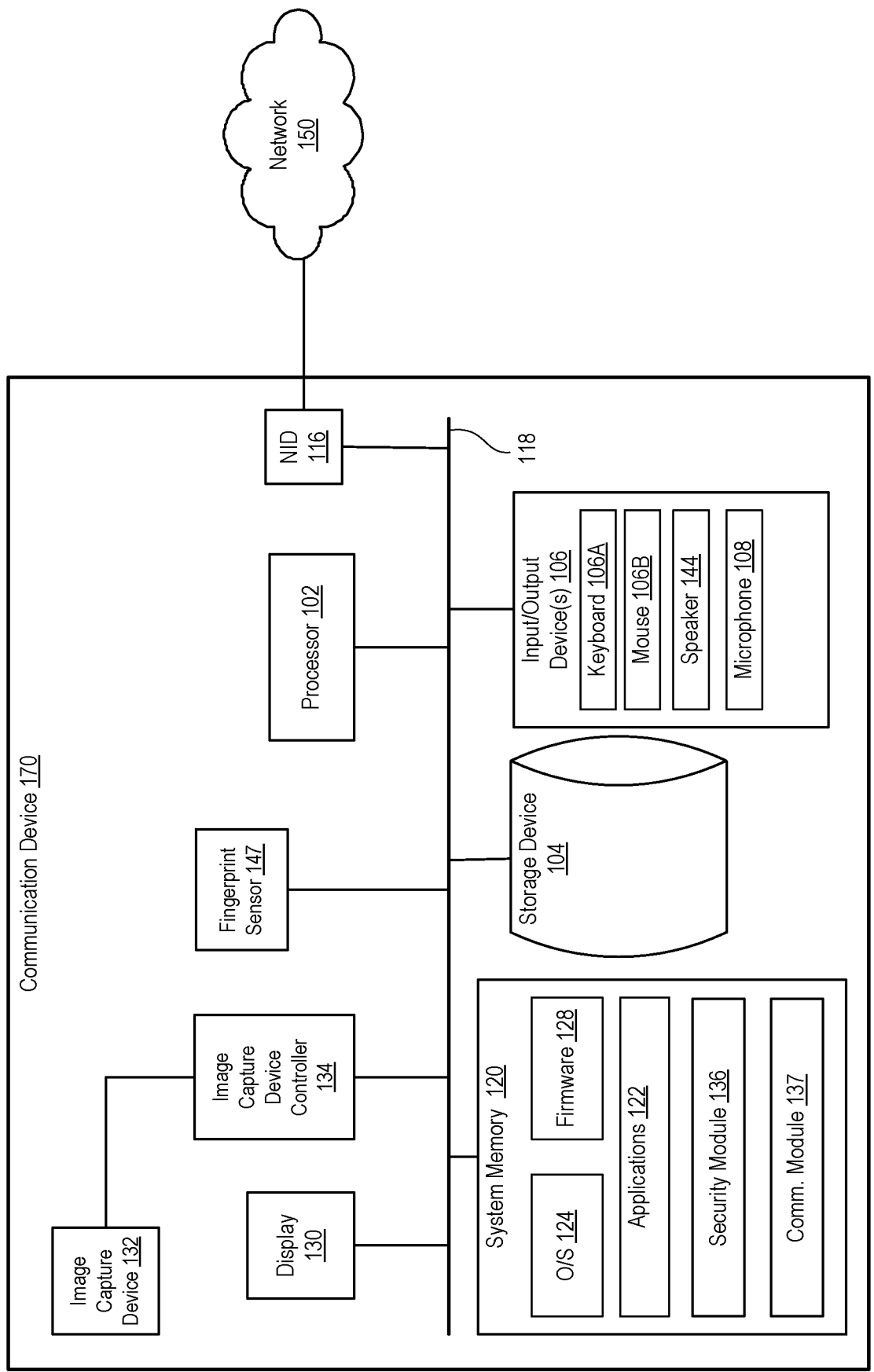
FIG. 1B communication device depicts an example configured as a computing device within which various aspects of the disclosure can be implemented, according to one or more embodiments.

FIG. 1B depicts an example communication device configured to be a computing device, according to one or more embodiments. Examples of such communication devices include, but are not limited to, a desktop computer, a television, a monitor, a smart-speaker, a notebook computer, etc. Communication device 170 includes a processor 102, storage device 104, system memory 120 and display 130. System bus 118 communicatively couples one or more of the processor 102, storage device 104, system memory 120 and display 130 with each other. Additionally, communication device 170 includes one or more input/output devices 106, network interface device (NID) 116, image capture device 132, image capture device controller 134 and fingerprint sensor 147. System bus 118 communicatively couples one or more input/output devices 106, NID 116, image capture device 132, image capture device controller 134 and fingerprint sensor 147 to one or more components, such as processor 102 and system memory 120. Input/output devices 106 can be various devices such as keyboard 106A, mouse 106B, speaker 144, microphone 108, etc.

System memory 120 may be a combination of volatile and non-volatile memory, such as random access memory (RAM) and read-only memory (ROM). System memory 120 can store program code or similar data associated with firmware 128, an operating system 124, applications 122, security module 136, and communication module 137. Security module 136 includes program code that is executed by processor 102 to protect communication device 170 from unwanted access. Communication module 137 includes program code that is executed by processor 102 to enable communication device 170 to communicate with other devices and systems. Processor 102 loads and executes program code stored in system memory 120. Examples of program code that may be loaded and executed by processor 102 include program code associated with applications 122 and program code associated with security module 136 and communication module 137. Although depicted as being separate from applications 122, security module 136 and communication module 137 may also be each implemented as one or more applications.

Communication device 170 can be in communication, via NID 116, with one or more networks, generally represented as network 150. Network 150 can be a variety of networks such as a local area network, a wide area network, a wireless network or the Internet.

Figure 2:
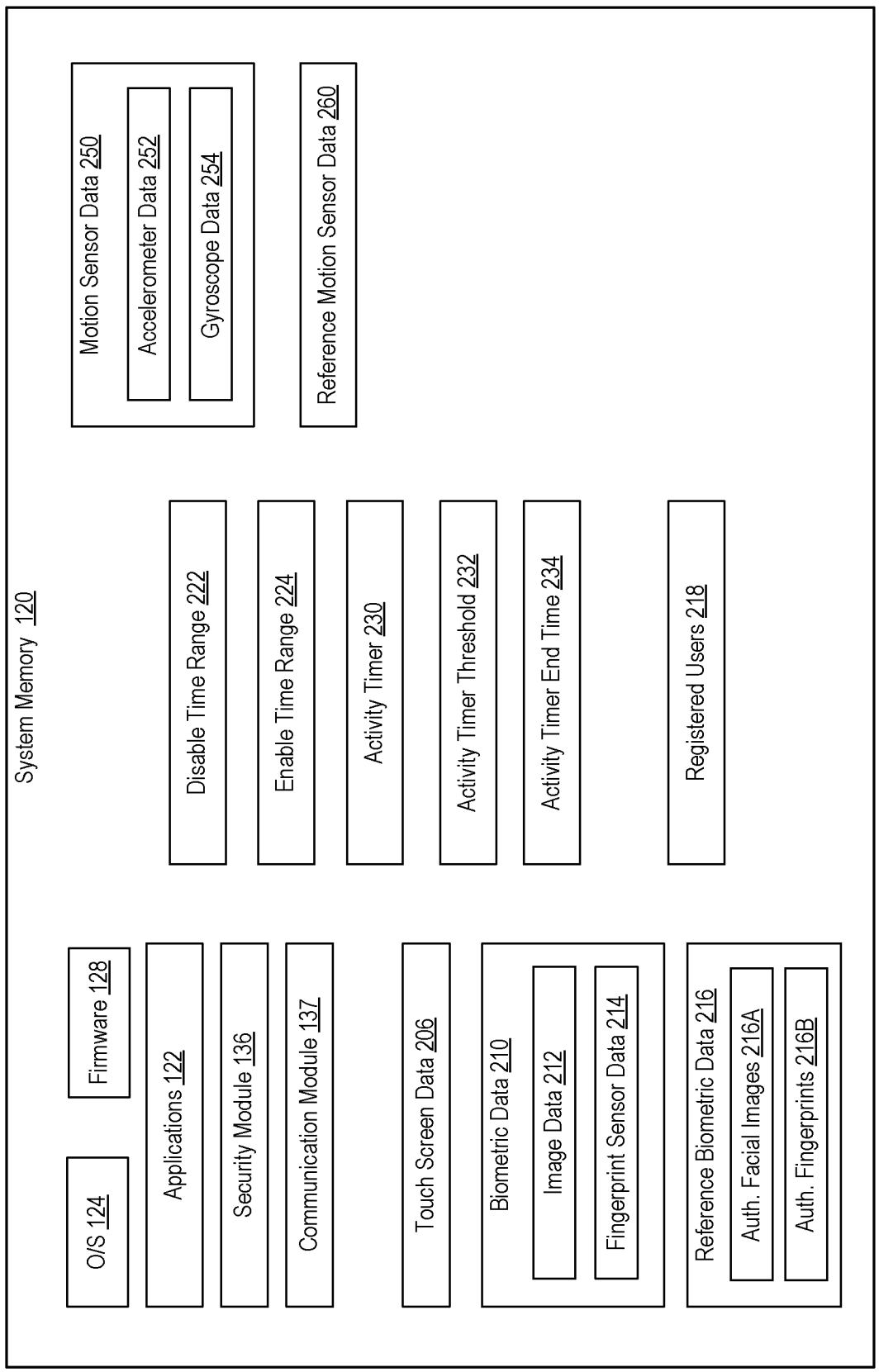
FIG. 2 is a block diagram of example contents of the system memory of a communication device, according to one or more embodiments.

In the description of each of the following figures, reference is also made to specific components illustrated within the preceding figure(s). With reference now to FIG. 2, one embodiment of example contents of system memory 120 of communication device 100/170 is shown. System memory 120 includes data, software, and/or firmware modules, including firmware 128, operating system 124, applications 122, security module 136, and communication module 137. In at least one embodiment, security module 136 protects communication device 100 or 170 from unwanted access by other individuals. In at least one embodiment, execution of security module 136 by processor 102 enables/configures communication device 100 or 170 to perform the processes presented in the flowcharts of FIGS. 4A-B and 5 as will be described below. Communication module 137 enables communication device 100 or 170 to communicate with network 150.

System memory 120 further includes touch screen data 206, biometric data 210, reference biometric data 216 and registered users 218. Touch screen data 206 is data received from touch screen interface 131 when touch screen interface 131 is touched by a user. In at least one embodiment, touch screen data 206 can be used to determine if display 130 is active or inactive. If no touch screen data 206 is received in a pre-determined time period, the display 130 and eventually the communication device can be identified as being inactive.

Biometric data 210 are distinctive measurable values, characteristics and biomarkers used to describe, identify and authenticate individuals. Biometric data 210 includes image data 212 and fingerprint sensor data 214. Image data 212 includes facial images captured by image capture device 132 (FIG. 1A and FIG. 1B). Fingerprint sensor data 214 includes fingerprint images captured by fingerprint sensor 147 (FIG. 1A and FIG. 1B).

Reference biometric data 216 are stored authenticated biomarkers of registered users associated with communication device 100 or 170. Reference biometric data 216 includes (i) stored authenticated facial images 216A of the face of registered users associated with communication devices 100 or 170 and (ii) stored authenticated fingerprints 216B of the fingers of registered users associated with communication devices 100 or 170. Registered users 218 are individuals associated with the communication device that have previously registered or enrolled with the communication device.

System memory 120 further includes disable time range 222 and enable time range 224. Disable time range 222 is a pre-determined time period of the day during which one or more biometric sensors (i.e., image capture device 132 or fingerprint sensor 147) can be disabled or have their output rejected or ignored as an input for securely accessing the communication device. Enable time range 224 is a pre-determined time period of the day during which one or more biometric sensors (i.e., image capture device 132 or fingerprint sensor 147) can be enabled or have their output accepted as an input for securely accessing the device.

In one or more embodiments, disable time range 222 can be generally established as a time period when most individuals are sleeping, such as between 11:00 PM and 5:00 AM. Additionally, enable time range 224 can be a generally established time period when most individuals are awake, such as between 5:00 AM and 11:00 PM. In at least one embodiment, disable time range 222 and enable time range 224 can be set by a registered user of communication device 100 selecting or inputting time boundaries via a user interface. In another embodiment, disable time range 222 and enable time range 224 can be autonomously determined by communication device 100 tracking the historical usage of communication device 100 over time.

System memory 120 further includes activity timer 230, activity timer threshold 232 and activity timer end time 234. Activity timer 230 tracks the length of time that display 130 is inactive. Activity timer 230 can also track a user's activity time using communication device 100. In at least one embodiment, touch screen data 206 received by processor 102 can be used to determine if display 130 is inactive. When no touch screen data 206 is received after a pre-determined period of time, display 130 can be identified as being inactive. In at least one embodiment, activity timer threshold 232 is a time value that is used to compare against the actual length of time that display 130 has been inactive. In one or more embodiments, activity timer threshold 232 is utilized as a back off timer. A back off timer is a timer with a variable time value that increases over time. In this embodiment, the value of activity timer threshold 232 (i.e., a back off timer) is incremented by some factor (e.g., 2× previous value) until a predetermined maximum value (referred to as activity timer end time 234) is reached. In at least one embodiment, when the value of activity timer 230 exceeds the current value of activity timer threshold 232, the current value of activity timer threshold 232 is increased to another value that is substantially larger than the previous value (e.g., 2× the previous value). In at least one embodiment, the value of activity timer threshold 232 can be incremented by a pre-determined value (e.g., a preset number of seconds) until a maximum value (i.e., activity timer end time 234) is reached. For example, activity timer threshold 232 could have increasing values of 20 seconds, 40 seconds, 80 seconds, 160 seconds, 320 seconds, 640 seconds and 1280 seconds, where 1280 seconds is the value of activity timer end time 234. When display 130 has been off for the entirety of the activity timer end time 234, display 130 and by extension communication device 100, 170 is identified as inactive, and the biometric sensor is de-activated from providing security access to communication device 100, 170.

Activity timer end time 234 is the maximum value of activity timer threshold 232. After activity timer end time 234 has been exceeded (i.e., the value of activity timer threshold 232 exceeds activity timer end time 234), display 130 and communication device 100 can be placed in and/or identified as being in a sleep mode. In the above example, activity timer end time 234 has a value of 1280 seconds, but can be a different value in other embodiments.

System memory 120 further includes motion sensor data 250 and reference motion sensor data 260. Motion sensor data 250 comprises data received from motion sensor 161. Motion sensor data 250 includes accelerometer data 252 received from accelerometers 162 and gyroscope data 254 received from gyroscope 163. Accelerometer data 252 contains linear acceleration values in multiple axes (X, Y, and Z) for a period of time. After the period of time, the values are written over with new linear acceleration values. Gyroscope data 254 contains rotation or angular rotational velocity values for a period of time. After the period of time, the values are written over with new rotation or angular rotation velocity values. Reference motion sensor data 260 is motion data associated with communication device 100 being in a sleep mode. In at least one embodiment, communication device 100 can be identified as being inactive (i.e., not being moved) or in a sleep mode when motion sensor data 250 matches reference motion sensor data 260.

Figure 3A:
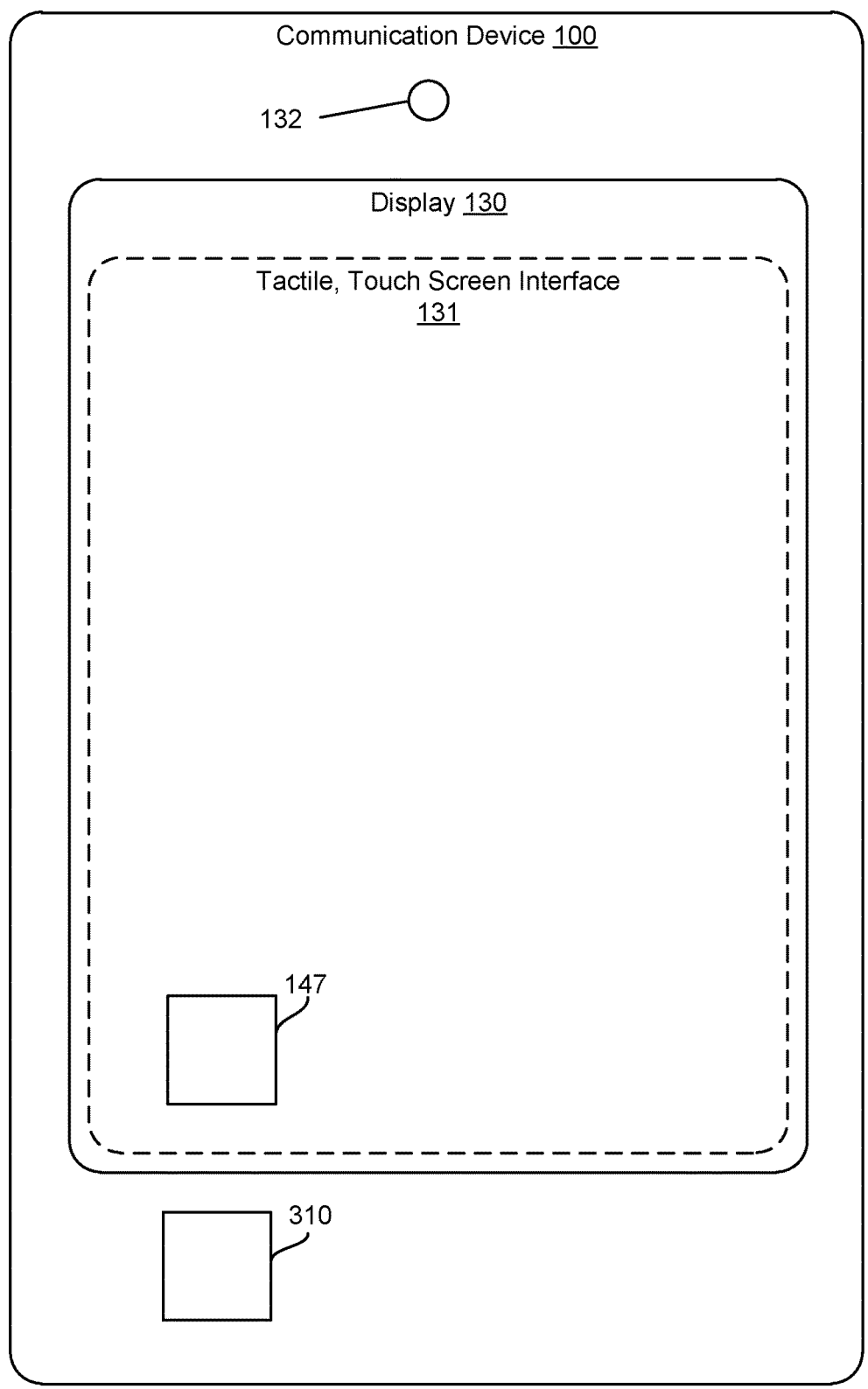
FIG. 3A is an example illustration of a display of a communication device showing an image capture device and a fingerprint sensor, according to one or more embodiments.

FIG. 3A illustrates an example communication device 100 including display 130, touch screen interface 131, image capture device 132 and fingerprint sensors 147 and 310. In at least one embodiment, fingerprint sensor 147 can be an optical fingerprint sensor and fingerprint sensor 310 can be a capacitive fingerprint sensor. Communication device 100 can be configured with one or both types of fingerprint sensors 147, 310. A user can biometrically authenticate their identity to communication device 100 using image capture device 132 (facial recognition) or fingerprint sensors 147 or 310 (fingerprint scan) when communication device 100 is in a locked mode. Communication device 100 typically enters a locked mode after a period of inactivity. Based, in part on historical tracking of the user interactions with communication device 100, a user's usage history time period is determined and recorded/stored to memory. Then, if a user (or another person) tries to access communication device 100 outside the recorded/stored usage history time period (i.e., within disable time range 222) and communication device 100 is in a sleep mode, image capture device 132 and fingerprint sensors 147 or 310 are disabled or the captured inputs from image capture device 132 and fingerprint sensors 147 or 310 are rejected (when presented as inputs to processor 102 for secure access verification). In order for a user to authenticate himself/herself to access communication device 100 within disable time range 222, the user will need to enter a personal identification number (PIN) or a passcode via touch screen interface 131.

Figure 3B:
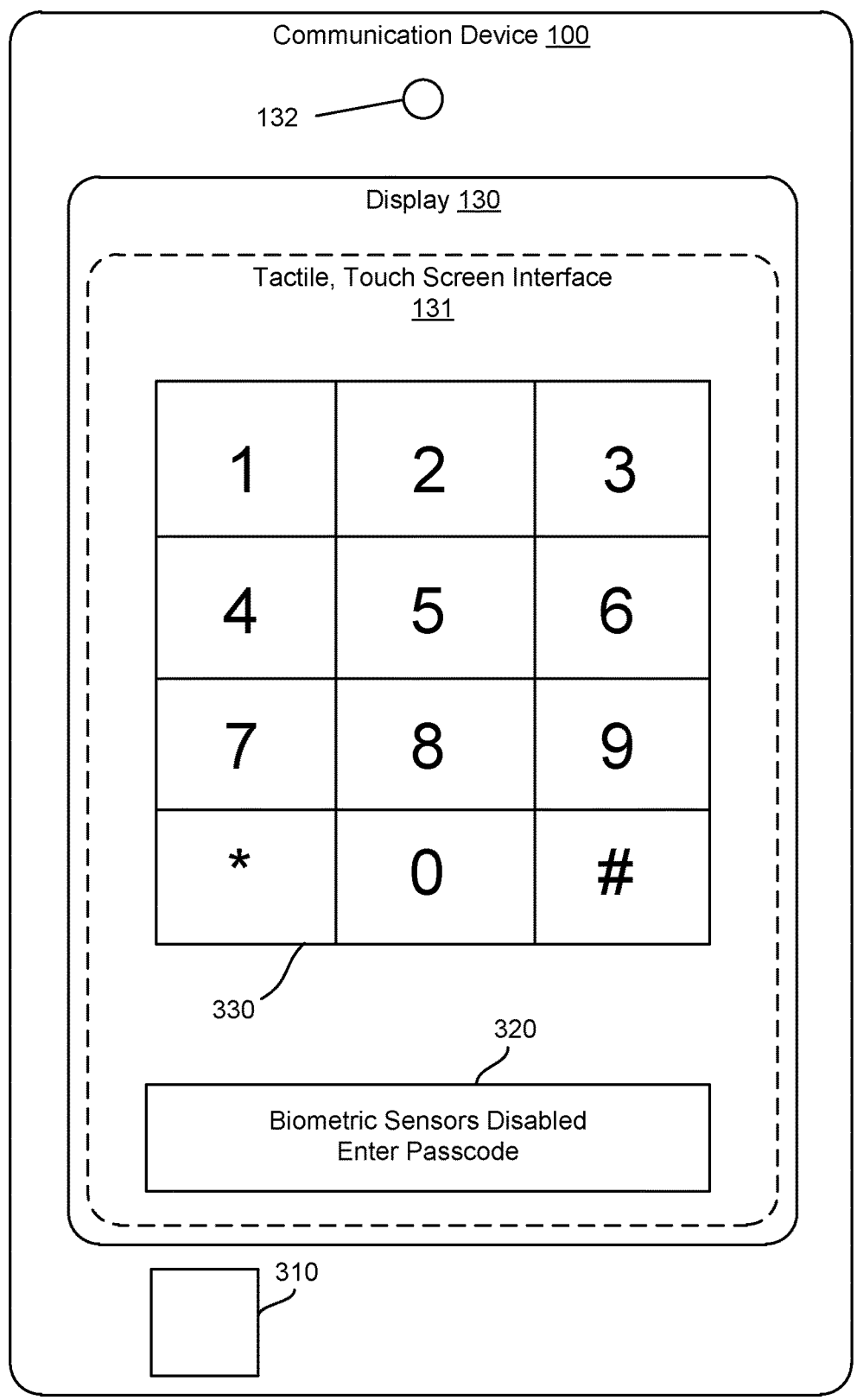
FIG. 3B is an example illustration of a display of a communication device showing a message rejecting biometric inputs and prompting a user for entry of a passcode, according to one or more embodiments.

FIG. 3B illustrates an example communication device 100 displaying a message 320 indicating that the biometric sensors (i.e., image capture device 132 and/or fingerprint sensor 147 or 310) are disabled. A keypad 330 is shown on display 130, prompting a user for entry of a personal identification number (PIN) or a passcode via touch screen interface 131 to access the communication device 100 when the biometric sensors are disabled.

In at least one embodiment, processor 102 (FIG. 1A) retrieves, from system memory 120, disable time range 222 and determines if the current time (from internal timer 103) is within the disable time range 222. In response to determining that the current time is within the disable time range 222, processor 102 determines if communication device 100 is in a sleep mode. In response to determining that the communication device 100 is in the sleep mode, processor 102 disables at least one biometric sensor (i.e., image capture device 132 and/or fingerprint sensor 147 or 310). However, if the communication device 100 is not yet in the sleep mode (e.g., where the user has been recently accessing the device, such that the communication device 100 has not yet cycled into sleep mode), the sensors remain active and available for general use by the user, including to re-authenticate access to the recently used communication device 100.

According to one aspect of the disclosure, communication devices, such as communication devices 100 and 170 can track and monitor their activity and usage history over time and generate enable time range 224. The remaining time during a 24-hour period can be generated as disable time range 222. Communication devices 100 and 170 can generate enable time range 224 and disable time range 222 as respective portions of a 24 hour period when the user's tracked and monitored activity shows frequent use of communication device 100 (enable time range 224), and when the user's tracked and monitored activity shows prolonged non-use of communication device 100 (disable time range 222). In at least one embodiment, the generation of enable time range 224 and disable time range 222 can incorporate tracking a user's schedule, and differences in days of the week such as holidays and weekends.

When a user wants to access the communication device 100 within their enable time range 224, the user can authenticate using facial recognition via image capture device 132 or using a fingerprint via fingerprint sensor 147. If a user tries to access the communication device outside their enable time range 224 and the communication device is in a sleep mode, image capture device 132 and/or fingerprint sensor 147 are disabled or the outputs from image capture device 132 and/or fingerprint sensor 147 are rejected. In order for a user to authenticate to access the communication device, outside enable time range 224, the user will need to enter a personal identification number (PIN) or a passcode via touch screen interface 131.

Figure 4A:
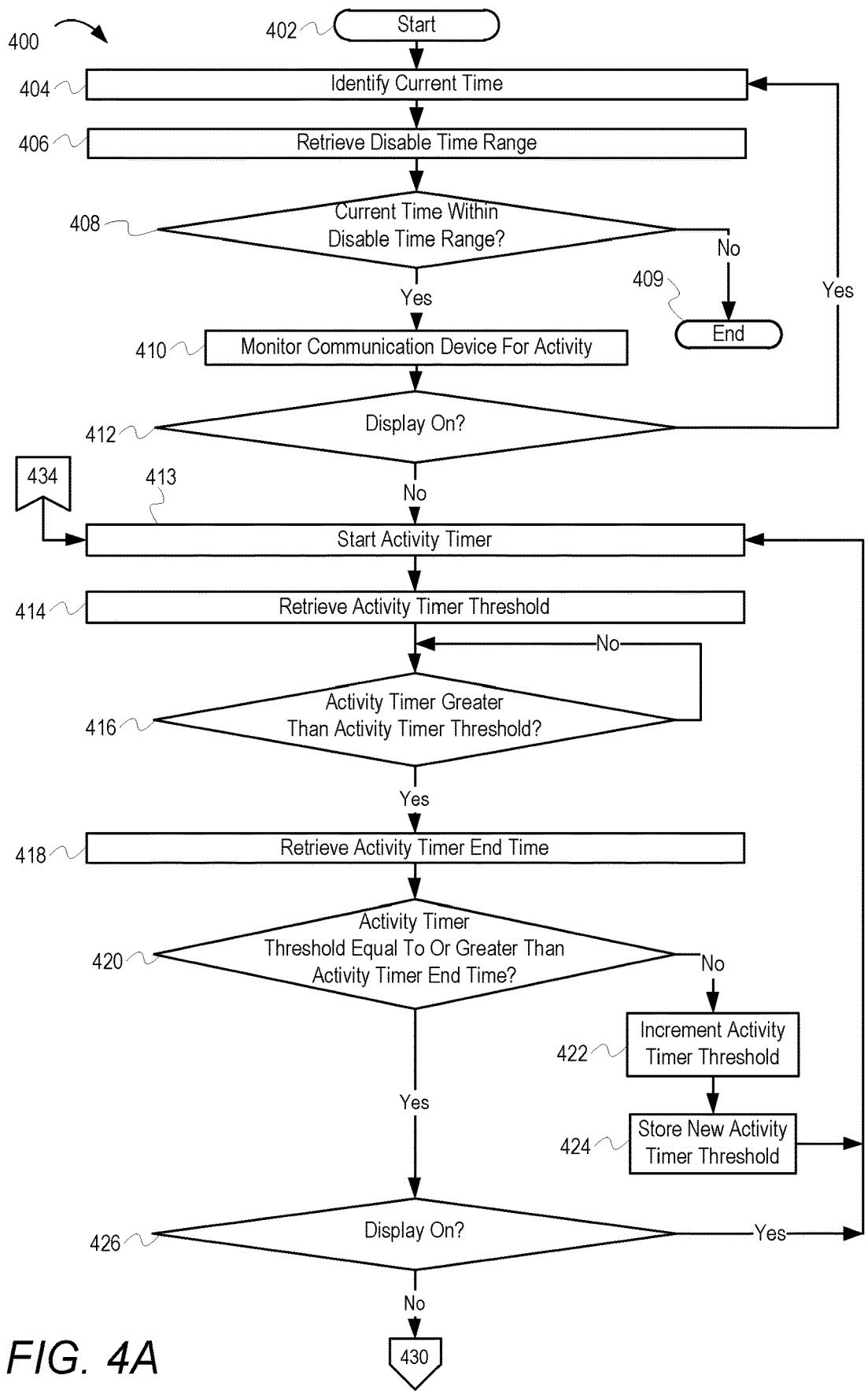
FIGS. 4A-B depict a flowchart of a method of disabling one or more biometric sensors of a communication device to protect the communication device from unwanted or unauthorized access, according to one or more embodiments.
Figure 4B:
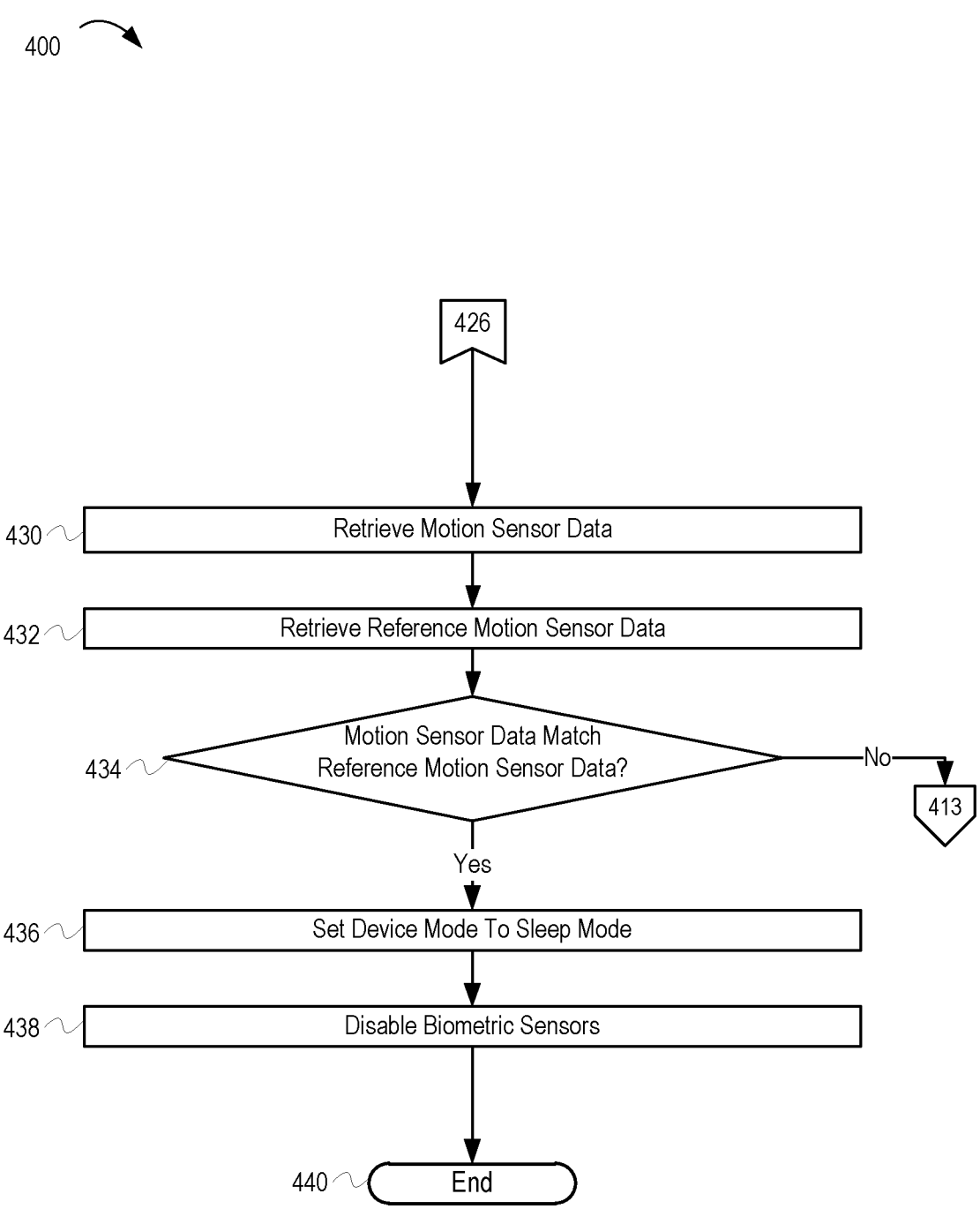
Figure 5:
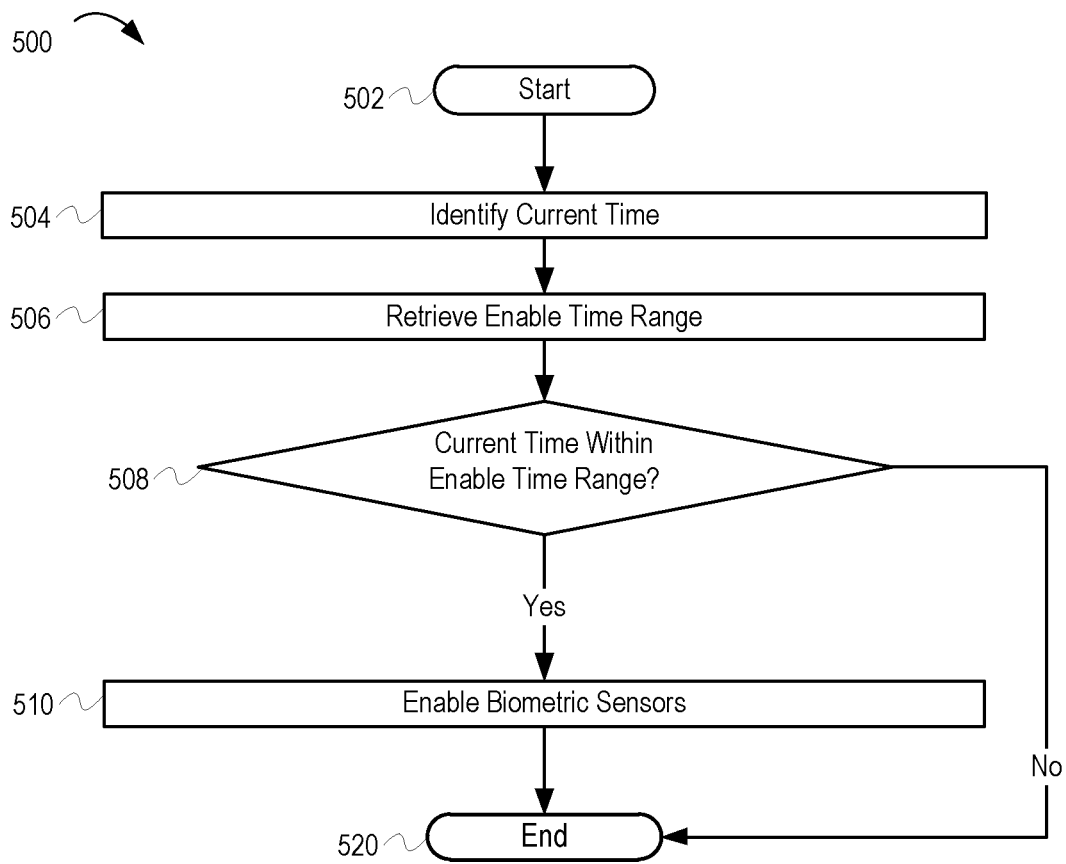
FIG. 5 depicts a flowchart of a method of re-enabling one or more biometric sensors of a communication device, according to one or more embodiments.

FIGS. 4A and 4B depict method 400 for disabling one or more biometric sensors of a communication device to protect the communication device from access by unwanted or unauthorized users. FIG. 5 depicts a method 500 for re-enabling one or more biometric sensors of a communication device. The description of methods 400 and 500 will be described with reference to the components and examples of FIGS. 1A-3. The operations depicted in FIGS. 4A-5 can be performed by communication device 100 or 170 or any suitable device, including one or more functional components of communication device 100 that provide the described features. Specifically, one or more of the processes of the methods described in FIGS. 4A-4B, 5 may be performed by a processor (e.g., processor 102) executing program code associated with security module 136.

With specific reference to FIG. 4A, method 400 begins at the start block 402. At block 404, processor 102 identifies the current time from internal timer 103 (block 404) and retrieves, from system memory 120, disable time range 222 (block 406). Processor 102 determines if the current time is within the disable time range 222 (decision block 408). In response to determining that the current time is not within the disable time range 222, method 400 ends at end block 409. A user is able to access and utilize the biometric sensors during the time period of enable time range 224.

In response to determining that the current time is within the disable time range 222, processor 102 monitors communication device 100 for activity, such as the display being active or touch screen input being received, while communication device 100 is in an unlocked state (block 410). Processor 102 determines if display 130 is on or active (decision block 412). In one or more embodiments, receipt of touch screen data 206 can be used to determine if display 130 is on or active. If no touch screen data 206 is received in a pre-determined time period, the display 130 can be identified as being off. If touch screen data 206 is received in a pre-determined time period, the display 130 can be identified as being on. In response to determining that the display is on, processor 102 returns to block 404 to continue monitoring the current time.

In response to determining that the display is not on, processor 102 starts activity timer 230 (block 413) and retrieves activity timer threshold 232 (block 414). At decision block 416, processor 102 determines if activity timer 230 is greater than activity timer threshold 232. In response to activity timer 230 not being greater than activity timer threshold 232, processor 102 continues to monitor for receipt of touch screen input, and also monitor whether activity timer 230 increments to a value that is greater than activity timer threshold 232 at block 416. In response to the value of activity timer 230 being greater than activity timer threshold 232, processor 102 retrieves activity timer end time 234 from system memory 120 (block 418). Processor 102 determines if the activity timer threshold 232 is equal to or greater than activity timer end time 234 (decision block 420). In response to determining that activity timer threshold 232 is not equal to or greater than activity timer end time 234, processor 102 increments activity timer threshold 232 (block 422) and stores the new activity timer threshold 232 to system memory 120 (block 424). Processor 102 then returns to block 413 to restart activity timer 230. Incrementing and storing new activity timer threshold 232 causes the time period between checking for activity of the communication device to increase (back off) over time.

In response to determining that activity timer threshold 232 is equal to or greater than activity timer end time 234, processor 102 determines if display 130 is on or active (decision block 426). In response to determining that the display is on, processor 102 returns to block 413 to restart activity timer 230.

Turning to FIG. 4B, in response to determining that the display is not on, processor 102 retrieves motion sensor data 250 (block 430) and retrieves reference motion sensor data 260 from system memory 120 (block 432). Processor 102 determines if motion sensor data 250 matches reference motion sensor data 260 (decision block 434). Motion sensor data 250 matching reference motion sensor data 260 indicates that communication device 100 is not moving or is stationary. In response to determining that motion sensor data 250 does not match reference motion sensor data 260, processor 102 returns to block 413 to restart activity timer 230. When motion sensor data 250 does not match reference motion sensor data 260, communication device 100 is active. In response to determining that motion sensor data 250 matches reference motion sensor data 260, processor 102 sets a mode of communication device to sleep mode (block 436). Processor 102 disables at least one biometric sensor (i.e., image capture device 132 and/or fingerprint sensor 147) or rejects input from at least one biometric sensor (block 438). Method 400 then terminates at end block 440.

FIG. 5 depicts a method 500 for re-enabling one or more biometric sensors of a communication device. With specific reference to FIG. 5, method 500 begins at the start block 502. At block 504, processor 102 identifies the current time from internal clock 103. Processor 102 retrieves, from system memory 120, enable time range 224 (block 506). Processor 102 determines if the current time is within the enable time range 224 (decision block 508). In response to determining that the current time is not within the enable time range 222, method 500 ends at end block 520.

In response to determining that the current time is within enable time range 222, processor 102 enables at least one biometric sensor that was previously disabled (e.g., image capture device 132 and/or fingerprint sensor 147) and/or processor begins to accept input from the at least one biometric sensor (block 510). Method 500 then terminates at end block 520.

In the above-described methods of FIGS. 4A-5, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A method comprising:
retrieving, from a memory, a biometric sensor disable time range;
determining, via a processor of a communication device, if a current time is within the biometric sensor disable time range, which is at least one of (i) a predetermined period of a day during which the biometric sensor is one of disabled or have its output rejected or ignored as an input for securely accessing the communication device; and (ii) autonomously determined by communication device tracking a historical usage of communication device over time;
in response to determining that the current time is within the biometric sensor disable time range, determining, by utilizing an activity timer, if the communication device is in a sleep mode, the activity timer having a variable time value that tracks a time during which a display of the device is inactive and which increases over time until a predetermined maximum value of an activity timer end time is reached that corresponds to the communication device being in the sleep mode; and in response to determining that the communication device is in the sleep mode, disabling at least one biometric sensor during times falling within the biometric sensor disable time range.

2. The method of claim 1, wherein the at least one biometric sensor is used to gain access to the communication device when the at least one biometric sensor is not disabled, the method further comprising:

in response to detecting a request to access the communication device when the at least one biometric sensor is disabled, displaying a prompt for entry of a passcode on a display of the communication device.

3. The method of claim 1, further comprising:

retrieving a biometric sensor enable time range from the memory;

determining if the current time is within the biometric sensor enable time range; and in response to determining that the current time is within the biometric sensor enable time range, enabling the at least one biometric sensor.

4. The method of claim 1, wherein determining if the communication device is in the sleep mode further comprises:

monitoring the communication device for activity;

determining if the display of the communication device is turned on, the display being automatically turned on when activity of the communication device is detected;

in response to determining that the display of the communication device is not turned on, starting the activity timer;

retrieving an activity timer threshold from the memory;

determining if a time value of the activity timer is greater than the activity timer threshold;

in response to determining that the time value of the activity timer is greater than the activity timer threshold, retrieving, from the memory, the activity timer end time that triggers entry of the communication device into the sleep mode;

determining if the activity timer threshold is equal to the activity timer end time; and in response to determining that the activity timer threshold is equal to the activity timer end time, setting an operating state of the communication device to the sleep mode.

5. The method of claim 1, further comprising:

retrieving an activity timer threshold from the memory;

incrementing the activity timer threshold by a preset number of seconds to generate a new activity timer threshold; and storing the new activity timer threshold to the memory, the new activity timer threshold being at least partially used to determine if the communication device is in the sleep mode.

6. The method of claim 1, further comprising:

prior to disabling the at least one biometric sensor, retrieving stored motion sensor data from the memory;

determining if the stored motion sensor data matches reference motion sensor data, the reference motion sensor data associated with the communication device being in the sleep mode; and in response to determining that the motion sensor data matches the reference motion sensor data, disabling the at least one biometric sensor.

7. The method of claim 1, further comprising:

start the activity timer and monitor a value of the activity timer;

in response to a current value of the activity timer exceeding a current value of activity timer threshold, increasing the current value of activity timer threshold to another value that is larger than a previous value, until the maximum value is reached or exceeded;

re-start the activity timer in response to the display of the mobile device being turned on; and identifying the communication device as being inactive and deactivating the biometric sensor in response to the communication device being off for an entirety of time equivalent to the activity timer end time.

8. The method of claim 7, wherein:

the value of the activity timer threshold is incremented by a pre-determined value until the maximum value of the activity timer end time is reached; and deactivating the biometric sensor comprises deactivating the biometric sensor from providing security access to communication device.

9. A communication device comprising:

a memory having stored thereon a security module for protecting the communication device from access by unauthorized users;

a display; and one or more processors communicatively coupled to the memory and the display, the one or more processors executing program code of the security module, which enables the computing system to:

retrieve a biometric sensor disable time range;

determine if a current time is within the biometric sensor disable time range, which is at least one of (i) a predetermined period of a day during which the biometric sensor is one of disabled or have its output rejected or ignored as an input for securely accessing the communication device; and (ii) autonomously determined by communication device tracking a historical usage of communication device over time;

in response to determining that the current time is within the biometric sensor disable time range, determining, by utilizing an activity timer, if the communication device is in a sleep mode, the activity timer having a variable time value that tracks a time during which the display of the device is inactive and which increases over time until a predetermined maximum value of an activity timer end time is reached that corresponds to the communication device being in the sleep mode; and in response to determining that the communication device is in the sleep mode, disable at least one biometric sensor during times falling within the biometric sensor disable time range.

10. The communication device of claim 9, wherein:

the at least one biometric sensor is used to gain access to the communication device when the at least one biometric sensor is not disabled; and the one or more processors are further enabled to: in response to detecting a request to access the communication device when the at least one biometric sensor is disabled, display a prompt for entry of a passcode on a display of the communication device.

11. The communication device of claim 9, wherein the one or more processors are further enabled to:

retrieve a biometric sensor enable time range from the memory;

determine if the current time is within the biometric sensor enable time range; and in response to determining that the current time is within the biometric sensor enable time range, enable the at least one biometric sensor.

12. The communication device of claim 9, wherein determining if the communication device is in the sleep mode further comprises the one or more processors being further enabled to:

monitor the communication device for activity;

determine if the display is turned on, the display being automatically turned on when activity of the communication device is detected;

in response to determining that the display of the communication device is not turned on:

start the activity timer;

retrieve the activity timer threshold from the memory;

determine if a time value of the activity timer is greater than an activity timer threshold;

in response to determining that the time value of the activity timer is greater than the activity timer threshold, retrieve, from the memory, the activity timer end time that triggers entry of the communication device into the sleep mode;

determine if the activity timer threshold is equal to the activity timer end time; and in response to determining that the activity timer threshold is equal to the activity timer end time, set an operating state of the communication device to the sleep mode; and in response to determining that the display of the mobile device is turned on, re-start the activity timer.

13. The communication device of claim 9, wherein the one or more processors are further enabled to:

retrieve an activity timer threshold from the memory;

increment an activity timer threshold by a preset number of seconds to generate a new activity timer threshold; and store the new activity timer threshold to the memory, the new activity timer threshold being at least partially used to determine if the communication device is in the sleep mode.

14. The communication device of claim 9, wherein the one or more processors are further enabled to:

prior to disabling the at least one biometric sensor, retrieve stored motion sensor data from the memory;

determine if the stored motion sensor data matches reference motion sensor data, the reference motion sensor data associated with the communication device being in the sleep mode; and in response to determining that the motion sensor data matches the reference motion sensor data, disable the at least one biometric sensor.

15. A computer program product comprising:

a computer readable storage device with program code stored thereon which, when executed by one or more processors of a communication device enables the communication device to complete the functionality of:

retrieving a biometric sensor disable time range;

determining if a current time is within the biometric sensor disable time range, which is at least one of (i) a predetermined period of a day during which the biometric sensor is one of disabled or have its output rejected or ignored as an input for securely accessing the communication device;

and (ii) autonomously determined by communication device tracking a historical usage of communication device over time;

in response to determining that the current time is within the biometric sensor disable time range, determining, by utilizing an activity timer, if the communication device is in a sleep mode, the activity timer having a variable time value that tracks a time during which a display of the device is inactive and which increases over time until a predetermined maximum value of an activity timer end time is reached that corresponds to the communication device being in the sleep mode; and in response to determining that the communication device is in the sleep mode, disabling at least one biometric sensor during times falling within the biometric sensor disable time range.

16. The computer program product of claim 15, wherein:

the at least one biometric sensor is used to gain access to the communication device when the at least one biometric sensor is not disabled; and the program code for protecting the communication device from unwanted access comprises program code that further enables the communication device to complete the functionality of, in response to detecting a request to access the communication device when the at least one biometric sensor is disabled, displaying a prompt for entry of a passcode on a display of the communication device.

17. The computer program product of claim 15, wherein the program code for protecting the communication device from unwanted access comprises program code that further enables the communication device to complete the functionality of:

retrieving a biometric sensor enable time range;

determining if the current time is within the biometric sensor enable time range; and in response to determining that the current time is within the biometric sensor enable time range, enabling the at least one biometric sensor.

* * * * *